United States Patent
Hughes et al.

(10) Patent No.: US 6,870,847 B2
(45) Date of Patent: *Mar. 22, 2005

(54) SCHEME FOR MERGING PARTIALLY FILLED ATM CELLS

(75) Inventors: David A. Hughes, Mountain View, CA (US); Alan Saldinger, Los Altos, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 100 days.

(21) Appl. No.: 08/825,492

(22) Filed: Mar. 28, 1997

(65) Prior Publication Data

US 2004/0120324 A1 Jun. 24, 2004

(51) Int. Cl.[7] .......................... H04Q 11/04; H04L 12/56
(52) U.S. Cl. .............................. 370/395.1; 370/395.6; 370/474
(58) Field of Search .............................. 370/230, 230.1, 370/231, 235, 389, 395.1, 395.4, 395.6, 670, 471, 474, 535, 397, 399, 392, 394, 470, 473, 477, 916

(56) References Cited

U.S. PATENT DOCUMENTS

| | | | | |
|---|---|---|---|---|
| 4,999,835 A | * | 3/1991 | Lagoutte | 370/389 |
| 5,323,389 A | * | 6/1994 | Bitz et al. | 370/397 |
| 5,390,175 A | * | 2/1995 | Hiller et al. | 370/398 |
| 5,414,701 A | * | 5/1995 | Shtayer et al. | 370/395.3 |
| 5,509,007 A | * | 4/1996 | Takashima et al. | 370/391 |
| 5,513,178 A | * | 4/1996 | Tanaka | 370/395 |
| 5,583,868 A | * | 12/1996 | Rashid et al. | 370/394 |
| 5,623,493 A | * | 4/1997 | Kagemoto | 370/397 |
| 5,650,993 A | * | 7/1997 | Lakshman et al. | 370/236 |
| 5,703,878 A | * | 12/1997 | Duault | 370/395 |

* cited by examiner

Primary Examiner—Alpus H. Hsu
(74) Attorney, Agent, or Firm—Blakely, Sokoloff, Taylor & Zafman LLP

(57) ABSTRACT

First and second partially filled ATM cells are removed from a cell stream and merged into a third ATM cell. The third ATM cell may then be inserted back into the cell stream. The third ATM cell may include header information indicative of the number of partially filled ATM cells from which it was created. To accommodate these operations, a data communication device, such as an ATM switch, is configured to identify partially filled ATM cells within an ATM cell stream. The device is also configured to merge at least two of the partially filled ATM cells into a merged ATM cell and to insert the merged ATM cell back into the ATM cell stream. Identifying partially filled ATM cells may involve use of a lookup table stored in a computer readable medium and indexable using logical connection identification information. The scheme can be used on a link-by-link basis within an ATM network or across multiple hops within such a network for combining cells traveling along a common route. The scheme is not limited to combining information on the same virtual channel or information which travels only between a common source and destination.

29 Claims, 4 Drawing Sheets

SCHEME FOR MERGING PARTIALLY FILLED ATM CELLS

FIELD OF THE INVENTION

The present invention relates generally to the field of cell switching network communications and, more specifically, to the merging of data information contained in multiple partially filled cells transported across such a network into a single cell to enable efficient use of available bandwidth.

BACKGROUND

The desire to integrate data, voice, image and video over high speed digital trunks has led to the development of a variety of packet and cell switching techniques. One such technique is called Asynchronous Transfer Mode (ATM). ATM is a switching technology that provides users with the ability to connect to one or more users in a transparent fashion. Unlike the variable length packets used by frame relay services, ATM service is based on switching fixed length packets of data known as cells. Cell switching, as it is called, is gaining popularity for a variety of reasons. First, switch architectures can be optimized to switch cells at much higher speeds than variable length packets. Second, multiple services requiring a variety of quality of service guarantees can be provided simultaneously. ATM user traffic is first segmented into fixed length cells, transmitted, then reassembled back into its original form. This segmentation and reassembly (SAR) process is done in a standardized way, regardless of the carrier providing the ATM service.

Although the use of fixed length cells in ATM can be efficient in terms of allowing standardized switching apparatus to be used, for many applications the standard 53-byte cell provides too large a package for the data requiring transport through the network. As a result, much of the cell payload is merely "padding" and the transport of such padding wastes the available bandwidth of the ATM network. Several approaches to solve this problem present themselves.

For example, one could use a shorter length cell. As indicated, ATM uses a standard 53-byte cell, with 48-bytes of payload and 5-bytes of header information. Choosing a smaller cell size could result in less of the cell payload being filled by padding. However, shorter cells have two important disadvantages. First, such cells would be non-standard and, as a result, such cells could not be transported through ATM networks designed to accommodate only standard size cells. This lack of interoperability would likely mean that users would be disinclined to accept such a solution. Second, smaller cells would likely end up wasting more bandwidth than they would save because the ratio of header size to payload is much higher than for a 53-byte cell. Unfortunately, the header size could probably not be reduced from the current 5-byte size without a loss of functionality.

Another solution might be to use variable length packets, as is common in frame relay networks. This could conceivably avoid the need for padding altogether because packets could be "custom built" to the requirements of the user data. Unfortunately, the very fact that such varying packet sizes are allowed within frame relay networks means that the switches used to transport the packets across the network must be more complex than their ATM counterparts. As a result, such switches are generally slower than ATM switches. Further, in networks where variable length packets are used, it is difficult to make real time service guarantees without the use of complex servicing and queuing algorithms and some limitations on packet size.

Yet another solution might be to pack multiple payloads into one cell at a source and then pull these payloads apart at a destination. The ATM Forum has begun discussions regarding such bundling of data channels within a single cell, however, it is recognized that this will only provide a solution for channels which have the same source and destination nodes. For example, referring to FIG. 1, multiple calls from end-system A to end-system B could be bundled together, but such calls could not be bundled with calls from end-system C to end-system D, even though they share a network trunk between switches 5 and 10. This results in less than ideal efficiency and also requires higher layer signaling support to assign slots in each cell to various channels and to manage the slot allocation across a network. Possibly, switches 5 and 10 could provide a server functionality which terminates all virtual channels (VCs) and swaps around sub-channels to improve efficiency on the network link between the switches. However, this solution would introduce significant complexity in switches 5 and 10 because the switches would now be required to understand the end-to-end channel assignments and pack and unpack data from many cells simultaneously. Besides the increased hardware complexity required for this function, the signaling and management of the reassignment of sub-channels would require complicated signaling.

Accordingly, what is needed is a scheme for ensuring that as much available payload space within the fixed length cells of ATM networks are used to transport user data rather than padding without resulting in the drawbacks of the methods described above.

SUMMARY AND OBJECTS OF THE INVENTION

It is, therefore, an object of the present invention to provide a method for merging two or more partially filled ATM cells into one merged ATM cell.

It is an additional object of the present invention to allow for splitting payload data in a merged ATM cell into two or more partially filled ATM cells.

These and other objects of the invention are achieved, in one embodiment, in a method for merging partially filled ATM cells in which first and second partially filled ATM cells are removed from a cell stream and merged into a third ATM cell. The third ATM cell may then be inserted back into the cell stream. The third ATM cell may include header information indicative of the number of partially filled ATM cells from which it was created.

In a further embodiment, a data communication device, such as an ATM switch, includes means for identifying partially filled ATM cells within an ATM cell stream. The device also includes means for merging at least two of the partially filled ATM cells into a merged ATM cell and means for inserting the merged ATM cell back into the ATM cell stream. The means for identifying partially filled ATM cells may comprise a lookup table stored in a computer readable medium and indexable using logical connection identification (e.g., VC) information.

The present invention can be used on a link-by-link basis within an ATM network or across multiple hops within such a network for combining cells traveling along a common route. The present invention is not limited to combining information on the same virtual channel or information which travels only between a common source and destination. The method maintains the use of standard ATM cells and so is compatible with existing and future ATM equipment. Other objects, features and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus to allow merging/splitting of partially filled ATM cells into/from a single merged ATM cell is described. According to one embodiment, partially filled ATM cells passing through a node of an ATM network are removed from an ATM cell stream and merged into a single ATM cell. The single, merged ATM cell may then be inserted back into the cell stream. Header information in the single, merged cell may be used to indicate the number of partially filled cells which were used to construct the single, merged cell.

Figure 1:
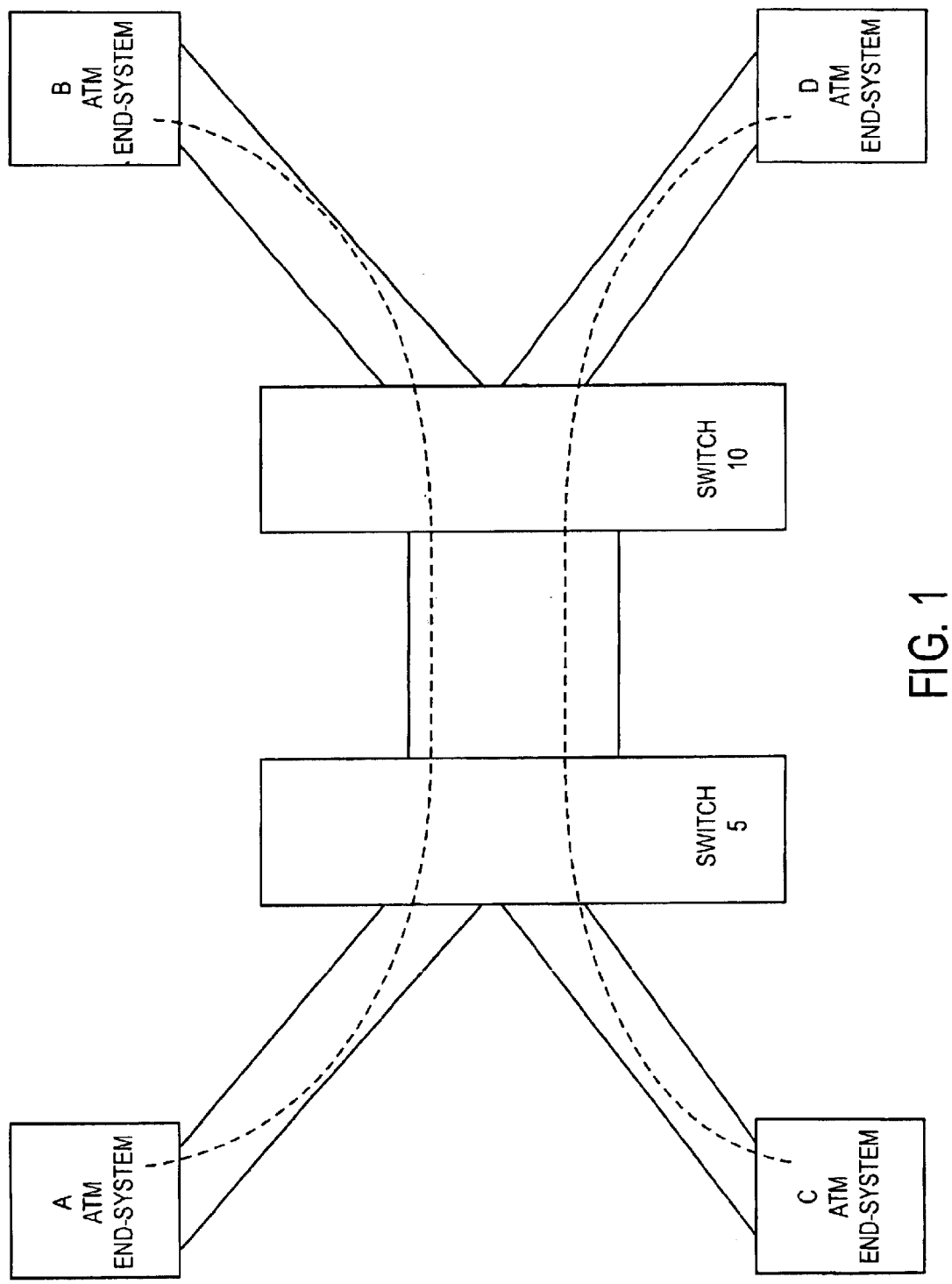
FIG. 1 illustrates a cell relay network having four end-stations and two switches with multiple calls routed between various end-stations.
Figure 2:
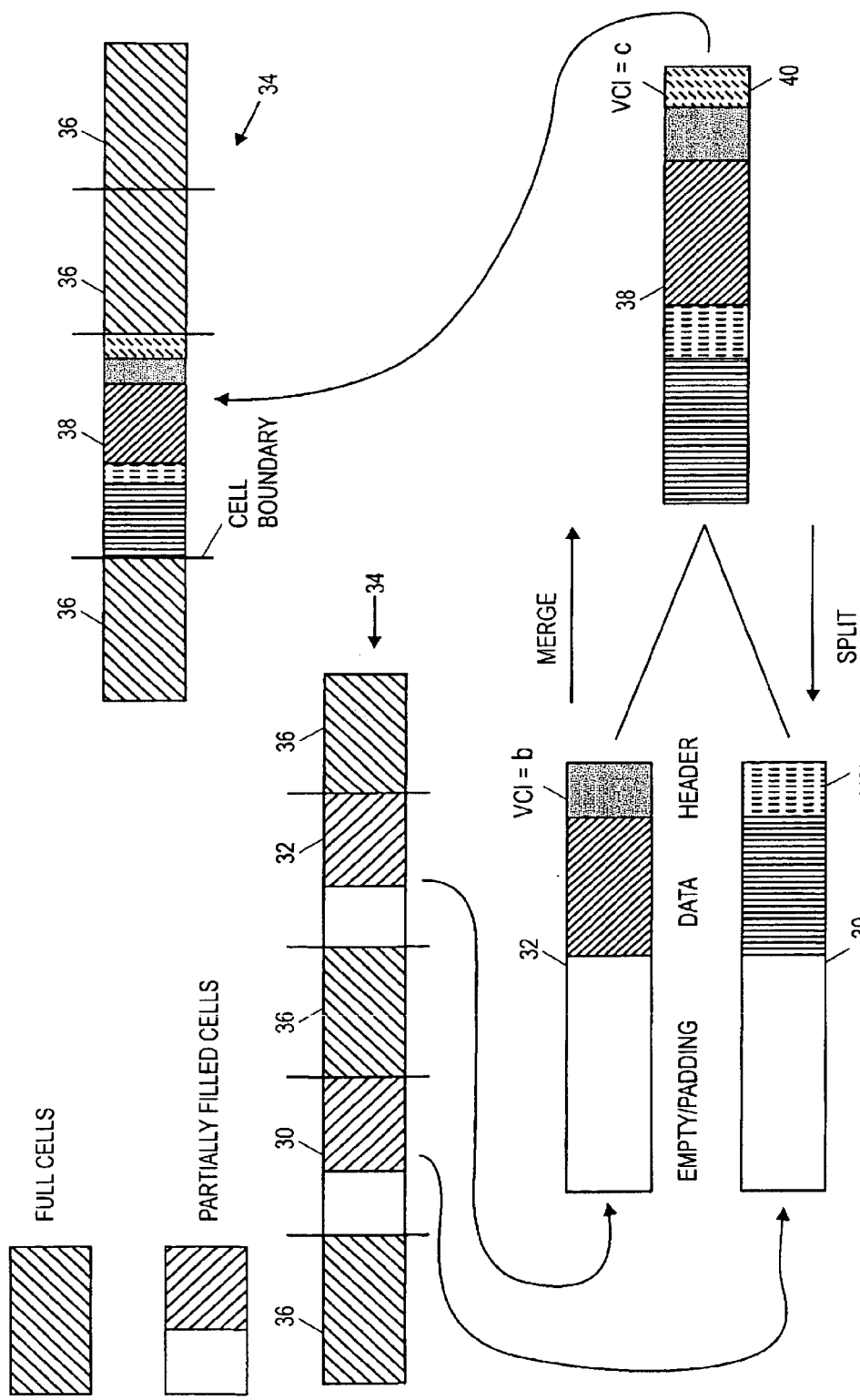
FIG. 2 illustrates the merging of two partially filled ATM cells into a single merged ATM cell according to one embodiment of the present invention.
Figure 3:
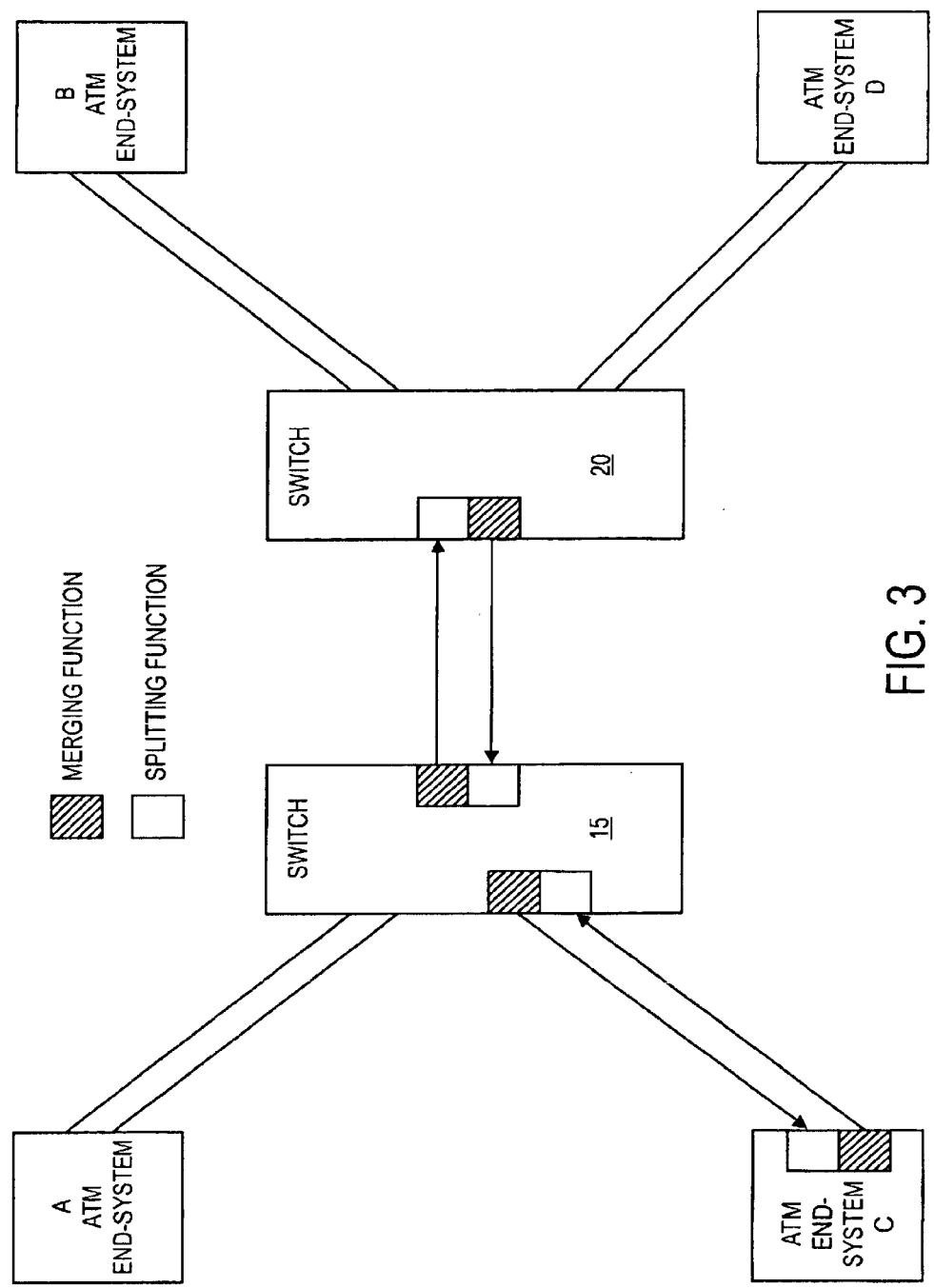
FIG. 3 illustrates the use of cell splitting and merging functions within various nodes of an ATM network according to one embodiment of the present invention.
Figure 4:
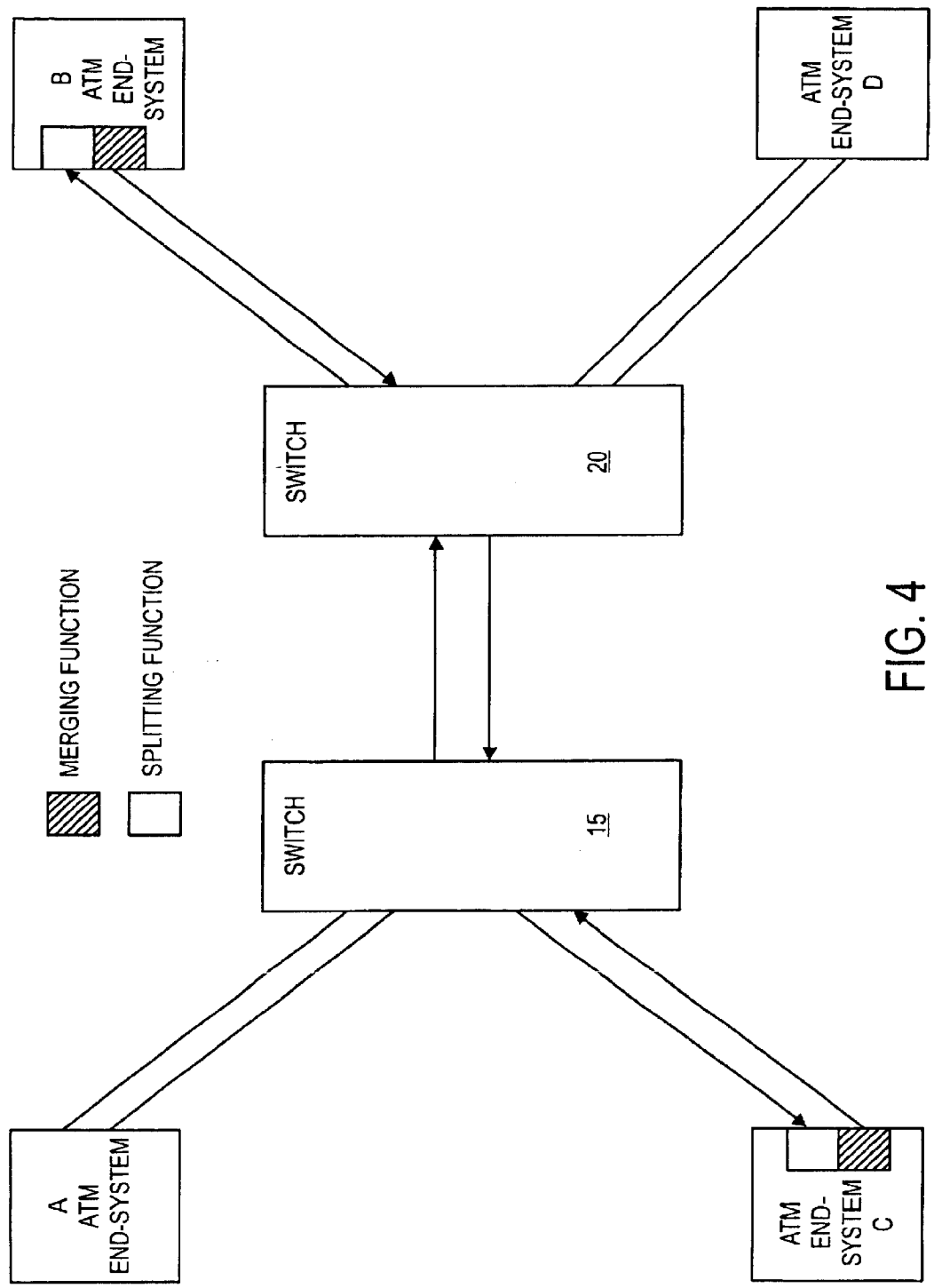
FIG. 4 illustrates the use of cell splitting and merging functions within end-nodes of an ATM network according to one embodiment of the present invention.

As shown in FIGS. 2–4, a means of combining payloads on different virtual channels (VCs) into a single cell is provided. A "merging" function is provided at a transmitting end of a link in an ATM network and a "splitting" function is provided at the receiving end of the link. These functions are provided below the ATM layer so that the operations are transparent to switches (such as switches 15 and 20 in FIGS. 3 and 4), end-systems (such as systems A, B, C and D in FIGS. 3 and 4) and signaling and application software.

FIG. 2 illustrates the essence of the merging and splitting functions provided at the ends of a transmission link. Partially filled ATM cells 30 and 32 are removed from a cell stream 34 at any node (e.g., a switch or and end-system) of an ATM network. The cell stream 34 also includes filled cells 36. The partially filled cells 30 and 32 are merged together (headers and payloads) into a single merged ATM cell 38 with a new header 40, and the new merged cell 38 is then reinserted back into the cell stream 34. FIG. 2 shows the case where two partially filled cells are merged into a single cell, however, it should be appreciated that other numbers of cells could be similarly merged, so long as the resulting cell maintains the 53-byte size of a standard ATM cell. Header 40 contains all of the information necessary to reconstruct the original cells 30 and 32 at a receiving end. This may include, for example, the number of partial cells contained in the merged cell, delineation information indicating the boundaries of the original cells in the merged cell, etc.

The merging algorithm works by holding a first partially filled cell until the next partially filled cell arrives. The user data and headers from the two partially filled cells are then merged into a single cell. If the second partially filled cell does not arrive within a preset time interval, then the first partially filled cell could be reinserted back into the cell stream unaltered so as to avoid lengthy delays and/or out-of-order cell transmission. During reception, a splitting algorithm recognizes (e.g., from the header information) a merged cell and splits the payloads and headers of the two partially filled cells back into separate cells which are then reinserted in the cell stream.

Many different merging schemes could be used. For example, a simple system might have fixed positions for n, 48/n-byte sub-cells. That is, if n represents the number of partially filled ATM cells to be merged into a single cell (n=2 in FIG. 2), then a system could allocate fixed positions for n such cells, each having 48/n bytes, within the single merged cell to be produced (e.g., 48/2=2×24-byte cells for the example shown in FIG. 2).

A more elaborate indexing scheme for multiple sub-cells of different lengths could also be used. In such a scheme, payload byte 1 of the merged cell might accommodate the length, 11, of partially filled cell 1 (user data and header); payload bytes 2 to 11+1 would then carry cell 1; payload byte 11+2 would accommodate the length of cell 2,; payload bytes 11+3 to 11+12+2 would then contain cell 2; and so on. To improve packing efficiency in either of these schemes, the header error correction (HEC) byte in the merged headers may be dropped. Also, it may be desirable to limit the VPI/VCI space in the merged cell headers to less than 28 bits. To provide protection, an error control byte for the entire merged cell could be provided.

The VCI of the merged cell (shown as VCI=c in FIG. 2, where the partially filled cell 30 had original VCI=a and partially filled cell 32 had original VCI=b) could be used to represent the merging method. Thus, multiple merging methods could be supported on a single link. For example, VCI=32 could be used to indicate that two cells are merged while VCI=33 could be used to indicate that three cells are merged, and so on.

When the cells are split at the receiving end, the unused bytes in the resulting partially filled cells must be padded. The value or method used for padding could be indicated by the VCI or conveyed as a coding in the merged cell payload.

The splitting and merging functions described above may be part of the physical convergence sub-layer so that the functions are transparent to the layers above. The functions can be deployed on a link by link basis within a network. As shown in FIG. 3, any short payload traffic traveling on the link between switches 15 and 20 could be merged, regardless of the end-to-end path. Similarly, any traffic on the link between end-system C and switch 15 could also be merged, regardless of the end-to-end path. Notice that where link by link merging and splitting is performed, the end-nodes of the merging/splitting operation carry out complementary functions. That is, for traffic between switches 15 and 20, if a merging operation is performed at switch 15, a complementary splitting operation is performed at switch 20, and vice-versa. Also, if a merging function is performed at end-system C, a splitting function will be performed at switch 15, and so on. Traffic on other links in the network illustrated in FIG. 3 would travel as in a conventional ATM system.

As extensions of the example illustrated in FIG. 3, the splitting/merging operations may be used to operate over virtual links, i.e., virtual paths (VPs) tunneled through switches without the merging or splitting functions. Note that for this approach, only cells traveling through the same tunnel can be merged. This could be identified by matching VPs or by use of a unique cell tag match, internal to the switches or end-systems.

Alternatively, the merging/splitting operations could be provided only on an end-to-end basis, if it is possible to identify which VCs are traveling on a common path. An example of this approach is illustrated in FIG. 4. End-systems B and C are configured with means to provide merging and splitting operations as described above. Traffic between end-systems B and C is passed between switches 15 and 20, neither of which are configured to provide merging/splitting operations. Merged traffic between end-systems B and C is passed between switches 15 and 20 in the same manner as any other ATM traffic because the merged cells maintain the standard ATM cell profile. When the merged cells reach a destination end-system, a splitting operation is performed and individual, partially filled cells are created. This example applies to cells traveling on the same end-to-end path, which could be identified using a cell tag match system internal to the end-systems.

It should be appreciated that the merging and splitting functions could reside at the inputs and outputs of a switch, be incorporated into a switch, or reside in an adjunct server module. However resident, the operations require a means to identify which cells are partially filled. This could be achieved in a variety of ways. For example, a table of bits (e.g., a lookup table)indexed by connection number or VCI/VPI indicating whether or not a connection can be compressed (i.e., merged). This would be suitable for applications such as compressed voice where virtually every cell contains only a partially filled payload. Alternatively, a new PTI (e.g., PTI=7) could be used to convey that the cell has a partially filled payload and is eligible for a merging operation. Further, partially filled cells could be identified by looking at AAL information, e.g., finding single cell AAL5 frames. Of course, other means of identifying partially filled cells are possible.

It will be appreciated that the merging and splitting operations could violate cell sequence integrity when a single virtual channel contains some partially filled cells and some fully packed cells. This can occur, for example, when partially filled cells are removed from a cell stream, e.g., in a switch, and a fully packed cell on the same virtual channel is passed while the partially filled cell is held, awaiting another partially filled cell to arrive. This problem can be avoided by checking for a match between the VPI/VCI of waiting partially filled cells and the VCI/VPI of fully packed cells which are passing by. When a match is detected, the partially filled cell(s) having the matching VCI/VPI is/are reinserted into the cell stream and scheduled before the fully packed cell, to avoid cell out-of-order transmission.

The merging/splitting operations discussed above improve the efficiency of the transport of short pieces of data while retaining the benefits of the ATM standard cell size. For compressed voice applications, it is believed that these operations can achieve transport efficiency over existing methods on the order of 2 to 4 times. Existing and future standard ATM switches and end-systems can accommodate these merging and splitting operations because the operations are transparent to the ATM level. The methods may be employed on a link by link basis and, therefore, there is no need for a network-wide equipment upgrade when some components are configured in accordance with the present invention. It is recognized that these methods may require a switch core to drive a merging unit and/or accept cells from a splitting unit at up to "n" times the link rate (where n=the number of partially filled cells to be merged into a single, merged cell). This may cause the apparent link capacity to fluctuate depending on the compression efficiency. However, this situation should not present a problem for lower speed links where compression efficiency is generally most important.

Thus, a method and apparatus for merging/splitting partially filled ATM cells into/from a single, merged ATM cell has been described. In the foregoing specification, the invention has been described with reference to specific exemplary embodiments thereof. It will, however, be clear that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for merging partially filled ATM cells, comprising the steps of:

removing a first partially filled ATM cell from an ATM cell stream;

removing a second partially filled ATM cell from the ATM cell stream; and merging the first partially filled ATM cell and the second partially filled ATM cell into a third ATM cell having information indicative of(i) a merging method used; and (ii) a padding method used for the first partially filled ATM cell.

2. A method for merging filled ATM cells as in claim 1, further comprising the step of:

inserting the third ATM cell into the ATM cell stream.

3. A method for merging partially filled ATM cells as in claim 2 wherein a header of said third ATM cell further includes information required to reconstruct the partially filled ATM cells contained within the third ATM cell.

4. A method for merging partially filled ATM cells as in claim 2 wherein the third ATM cell is inserted into the ATM cell stream so as to maintain correct cell ordering within the ATM cell stream.

5. A method for merging partially filled ATM cells as in claim 4 wherein said steps of removing a first partially filled ATM cell from an ATM cell stream; removing a second partially filled ATM cell from the ATM cell stream; and merging the first partially filled ATM cell and the second partially filled ATM cell into a third ATM cell are carried out in an ATM switch.

6. A method for merging partially filled ATM cells as in claim 4 wherein said steps of removing a first partially filled ATM cell from an ATM cell stream; removing a second partially filled ATM cell from the ATM cell stream; and merging the first partially filled ATM cell and the second partially filled ATM cell into a third ATM cell are carried out in an ATM end-system.

7. A method for merging partially filled ATM cells as in claim 4 further comprising the step of transmitting the third ATM cell.

8. The method of claim 1 wherein the third ATM cell further includes information indicative of the number of partially filled ATM cells contained within the third ATM cell.

9. The method of claim 1 wherein the information indicative of the merging method used and the padding method used is contained within a header of the third ATM cell.

10. The method of claim 1 wherein at least one of the first or second partially filled ATM cell is identified on the basis of at least one of the following indicia: a connection number, a VCI/VPI, a PTI, or AAL information.

11. An ATM network, comprising:

a first node configured to identify partially filled ATM cells within an ATM cell stream passing through the first node and to merge two or more of the partially filled ATM cells in the cell stream into a merged cell the merged cell having information indicative of (i) a merging method used, and (ii) a padding method used for one of the partially filled ATM cells; and a second node coupled to the first node and configured to identify a merged ATM cells and to split the merged ATM cell into two or more partially filled ATM cells.

12. An ATM network as in claim 11 wherein the first node is configured such that circuitry in the first node performs the steps of:

removing a first partially filled ATM cell from the ATM cell stream;

removing a second partially filled ATM cell from the ATM cell stream; and merging the first partially filled ATM cell and the second partially filled ATM cell into a third ATM cell.

13. An ATM network as in claim 12 wherein the first node is further configured such that circuitry in the first node performs the further step of:

inserting the third ATM cell into the ATM cell stream.

14. An ATM network as in claim 13 wherein the third ATM cell is inserted into the ATM cell stream so as to maintain correct cell ordering within the ATM cell stream.

15. An ATM network as in claim 13 wherein the first node is an ATM end-system.

16. An ATM network as in claim 13 wherein the first node is an ATM switch.

17. The ATM network of claim 11 wherein the merged cell further includes information indicative of the number of partially filled ATM cells contained within the third ATM cell.

18. The ATM network of claim 11 wherein the information indicative of the merging method used and the padding method used is contained within a header of the merged cell.

19. The ATM network of claim 11 wherein the first node of configured to identify partially filled ATM cells on the basis of at least one of the following indicia: a connection number, a VCI/VPI, a PTI, or AAL information.

20. The ATM network of claim 11 wherein the first ATM node is configured to check for a match between VPIs/VCIs of waiting partially filled ATM cells and a VCI/VPI of a fully packed ATM cell in the cell stream.

21. The ATM network of claim 20 wherein the first ATM node is further configured to reinsert the waiting partially filled ATM cells into the cell stream and before the fully packed cell when the VPIs/VCIs of the waiting partially filled ATM cells and the VCI/VPI of the fully packed ATM cell, to avoid cell out-of-order transmission within the ATM cell stream.

22. A method, comprising identifying partially filled ATM cells within an ATM cell stream according to a lookup table indexed by connection identification information indicating whether or not a connection includes partially filled ATM cells that can be merged, and merging two or more of the partially filled ATM cells into a fully packed ATM cell, wherein the fully packed ATM cell includes information indicative of the padding method used in the two or more partially filled ATM cells.

23. The method of claim 22 wherein the fully packed ATM cell has a header that includes information indicative of merging method used.

24. The method of claim 23 wherein the fully packed ATM cell further includes information required to reconstruct the two or more partially filled ATM cells.

25. An ATM mode, comprising a cell merging apparatus configured to identify partially filled ATM cells within a cell stream according to lookup table indexed by connection identification information, merge two or more partially filled ATM cells into a third ATM cell, and to avoid cell out-of-order transmission within the cell stream and before a fully packed cell when VPIs/SCIs of the two or more partially filled ATM cells and a VCI/VPI of the fully packed ATM cell match.

26. The ATM node of claim 25, wherein the cell merging apparatus is further configured to insert the third ATM cell into on outgoing cell stream so as to avoid cell out-of-order transmission within the cell stream.

27. The ATM node of claim 25, wherein the cell merging apparatus is further configured to construct the third ATM cell so that the third ATM cell includes information indicative of a merging method of use.

28. An ATM mode, comprising a cell merging apparatus configured to identify partially filled ATM cells within a cell stream according to lookup table indexed by connection identification information, merge two or more partially filled ATM cells into a third ATM cell, and to construct the third ATM cell so that the third ATM cell includes information indicative of a padding method used for the partially filled ATM cells.

29. The ATM node of claim 28, wherein the cell merging apparatus is further configured to construct the third ATM cell so that the third ATM cell includes information indicative of a merging method used.

* * * * *